United States Patent
Huang

(10) Patent No.: US 6,758,100 B2
(45) Date of Patent: Jul. 6, 2004

(54) DOPPLER FLOWMETER FOR MULTIPHASE FLOWS

(75) Inventor: Songming Huang, Hardwick (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/873,572

(22) Filed: Jun. 4, 2001

(65) Prior Publication Data

US 2002/0011120 A1 Jan. 31, 2002

(30) Foreign Application Priority Data

Jun. 12, 2000 (GB) ............................................ 0014334

(51) Int. Cl.[7] .............................................. G01F 1/66
(52) U.S. Cl. .................................................. 73/861.25
(58) Field of Search .......................... 73/861.25–861.31

(56) References Cited

U.S. PATENT DOCUMENTS

| | | | |
|---|---|---|---|
| 4,467,659 A | 8/1984 | Baumoel | 73/861.27 |
| 5,251,490 A | 10/1993 | Kronberg | 73/861.25 |
| 5,463,906 A | 11/1995 | Spani et al. | 73/861.27 |
| 5,793,216 A | * 8/1998 | Constant | 324/639 |

FOREIGN PATENT DOCUMENTS

| | | | |
|---|---|---|---|
| GB | 2279146 A | 6/1993 | G01F/1/66 |
| GB | 2343249 B | 10/1999 | G01F/1/66 |
| WO | WO 00/03207 | 2/2000 | G01F/1/66 |

OTHER PUBLICATIONS

Int. J. Heat & Fluid Flow, (1986), pp. 313–318, Y Takeda, "Velocity Profile Measurement by Ultrasound Doppler Shift Method".

Documentation of Multiphase Metering Conference, (Mar. 1997), pp. 1–15, M. Constant et al., "Multiphase Metering Using Ultrasonics as an Alternative Approach".

Euroson 87, (Jun. 1987), p. 300, J. C. Willemetz et al., "Instantaneous Doppler Frequency Measurement and Implementation in a Multigate Flowmeter".

Ultrasonic Mearsurements for Process Control, (Academic Press 1989), pp. 26, 27, 30, 254, 255, L. C. Lynnworth.

Ultransonic Measurements for Process Control, (Academic Press 1989), pp. 312–317, L. C. Lynnworth.

* cited by examiner

*Primary Examiner*—Harshad Patel
(74) *Attorney, Agent, or Firm*—William L. Wang; William B. Batzer; John J. Ryberg

(57) ABSTRACT

There is provided an apparatus for measuring flow rates of multi-phase flows in metal pipes, the apparatus comprising a transceiver generating a pulsed Doppler signal in the range 100 KHz to 10 microHz and an impedance device adapted to be coupled to a pipe so as to reduce or prevent reflections occurring from a pipe wall in response to the pulsed signal. The apparatus includes signal processor for analysing reflected signals received by the transceiver and for calculating the energy contained in a received signal. The pulsed signal is a shear wave which assists analysis of the reflected signals. The impedance device comprises a sound absorbing block made from plastics material with tungsten particles embedded therein. Different embodiments using various arrangements of transceivers are described, and also a related method of using the apparatus.

20 Claims, 9 Drawing Sheets

DOPPLER FLOWMETER FOR MULTIPHASE FLOWS

FIELD OF THE INVENTION

This invention relates to a flowmeter for use in connection with metal pipes, and in particular a non-invasive flowmeter using a pulsed narrow band ultrasonic signal to detect different phases present in a fluid flowing through a pipe.

BACKGROUND TO THE INVENTION

Flowmeters which are clamped externally onto pipes to measure flows occurring within the pipes in a non-invasive manner are well known. Certain of these flowmeters use an ultrasound signal to monitor single-phase flows in industrial pipes. However, these meters are limited in application as they cannot be used to monitor multi-phase flows of gas/liquid or gas/oil/water in metal pipes, such as are common in the oil industry. This is because the metal pipes cause unwanted reflection of the ultrasound signal and also gas bubbles in the fluid tend to attenuate and scatter the signal. This makes interpretation of a reflected ultrasound signal very difficult.

The present invention aims to provide a flowmeter which is capable of monitoring multi-phase flows occurring in metal pipes.

SUMMARY OF THE INVENTION

In accordance with one aspect of the present invention, there is provided apparatus for measuring flow rates in metal pipes, the apparatus comprising transceiver means generating a pulsed narrow band ultrasonic signal in the range 100 KHz to 10 MHz and matching means adapted to be coupled to a pipe so as to reduce or prevent reflections from occurring from a pipe wall in response to the pulsed signal. The use of a pulsed Doppler measurement in combination with a matching means allows analysis of multi-phase flows within metal pipes to be undertaken.

The pulsed signal is generated at a known frequency and as is usual with Doppler-type analysis, a shift in frequency of a signal returned from a moving body can be used to determine the velocity of the moving body.

Accordingly, the apparatus preferably further comprises a signal processing means for analysing the reflected signals received by the transceiver means. This allows shifts in frequency of the reflected signal from that of the generated pulsed signal to be analysed to give a measure of the velocity of phases within a flow contained in a metal pipe.

The signal processing means desirably further comprises means for calculating the energy contained in the Doppler frequency shifted part of the a reflected signal.

Preferably the signal processing means further comprises means for calculating flow rates of at least two phases in a flow contained in a metal pipe. The invention is particularly applicable to flows occurring in horizontal pipes and for two phase flows, although in certain circumstances analysis of flows containing three phases can be undertaken, as can analysis of flows in vertical pipes.

To allow an analysis of the reflected Doppler signals according to depth of origin within a pipe wall, the signal processing means may further comprise range-gate channels for acquisition of data relating to the reflected signals.

A number of different embodiments are possible for apparatus in accordance with the present invention, and thus the transceiver means may be a transceiver, the matching means an impedance matching device, with the transceiver and impedance matching device being contained in a common housing. Measurements using the apparatus are typically obtained at more than one position, and where the transceiver and impedance device are contained in the common housing, multi-positional measurements may be obtained by moving the apparatus around a pipe so that successive measurements are taken at different angles to the vertical.

In a further embodiment, the transceiver means preferably comprises a plurality of transceivers, and similarly the matching means may comprise a plurality of impedance devices, such that each transceiver may be held in a common housing with a respective impedance matching device. In such an embodiment, there are thus a plurality of housings each containing a transceiver and an impedance matching device and multi-positional measurement about the circumference of a pipe may be obtained by spacing the housings around an outer surface of the pipe.

Where a common housing is provided for a transceiver and an impedance device, preferably the housing includes a frequency transparent material to allow signals from the transceiver to be emitted from the housing without distortion. This ensures that the signal characteristics of the pulsed signal are not affected by the impedance device.

To ensure that there is sufficient contact area between the housing and a pipe on which measures of flow are to be undertaken, preferably the housing comprises a contact face for engaging with a pipe, the contact face having a groove of complimentary curvature to a pipe wall. This ensures that sufficient energy of the pulsed signal is transmitted into fluid contained in the pipe.

Desirably the impedance matching device has its impedance substantially matched to that of a pipe wall on which the apparatus is to be used. By matching the impedance in this way, energy transmission between the transceiver and the fluid is mainly limited to the region of direct contact between the transceiver and the pipe wall as dispersion of energy into the area of pipe surrounding the transceiver is limited due to damping associated with the impedance matching material.

The impedance matching device may comprise a sound absorbing block and the block may be made from plastics material, such as epoxy, with metal particles, such as tungsten, embedded therein. Rubber with tungsten particles embedded therein is also suitable, as is any material with an impedance similar to the metal from which the pipe is made.

The impedance matching device may also comprise an irregular surface to scatter unwanted reflective signals, and so minimise specular reflections. One type of irregular surface suitable, is a surface with a repeating saw tooth edge in profile.

The pulsed signal propagating in the pipe wall is preferably a shear wave, which again acts to limit the amount of energy dispersion along the length of the pipe, as opposed to the desired energy transmission through the pipe wall and into the fluid. Whilst an element of compressional wave may be within the pulsed signal, it is preferred that the pulsed signal propagating in the pipe wall is entirely a shear wave.

In accordance with another aspect of the present invention, there is provided a method for measuring flow rates in metal pipes, comprising attaching a transceiver means and matching means to a metal pipe containing fluids, generating a pulsed signal in the range 100 Khz to 10 MHz, transmitting the pulsed signal into fluid contained in the pipe, receiving a reflected signal from the fluid and analysing the reflected signal to determine different phases contained in the fluid.

The matching means reduces or prevents reflections occurring from a pipe wall in response to the pulsed signal.

Preferably, the method further comprises angling the transceiver means relative to a pipe to which it is attached, so as to achieve propagation of the pulsed signal as a shear wave. This helps ensure that a substantial proportion of the energy associated with the pulsed signal is transmitted into the fluid, and not just along the pipe wall.

The pulsed signal preferably propagates the shear wave at an angle between 35–85° in a pipe wall, although other angles of incidence may be used, particularly where it is acceptable to have an element of compression wave in the pulsed signal. More preferably the angle should be between 45–75°.

The reflected signal is preferably analysed to determine its energy in the Doppler frequency shifted region, and analysis can also be undertaken using range-gate channels to allow the reflected signal to be analysed according to depth of origin within the fluid. Preferably the method further comprises measuring the reflected signal at a plurality of positions, the measurements being spaced apart in time. This can either be achieved by moving the transceiver means and matching means around the metal pipe, or by the transceiver means and matching means comprising a plurality of pairs of transceivers and impedance devices, these pairs being spaced apart on the pipe surface to achieve multi-positional measurement.

The invention will now be described, by way of example, and with reference to the accompanying drawings, in which.

Figure 10:
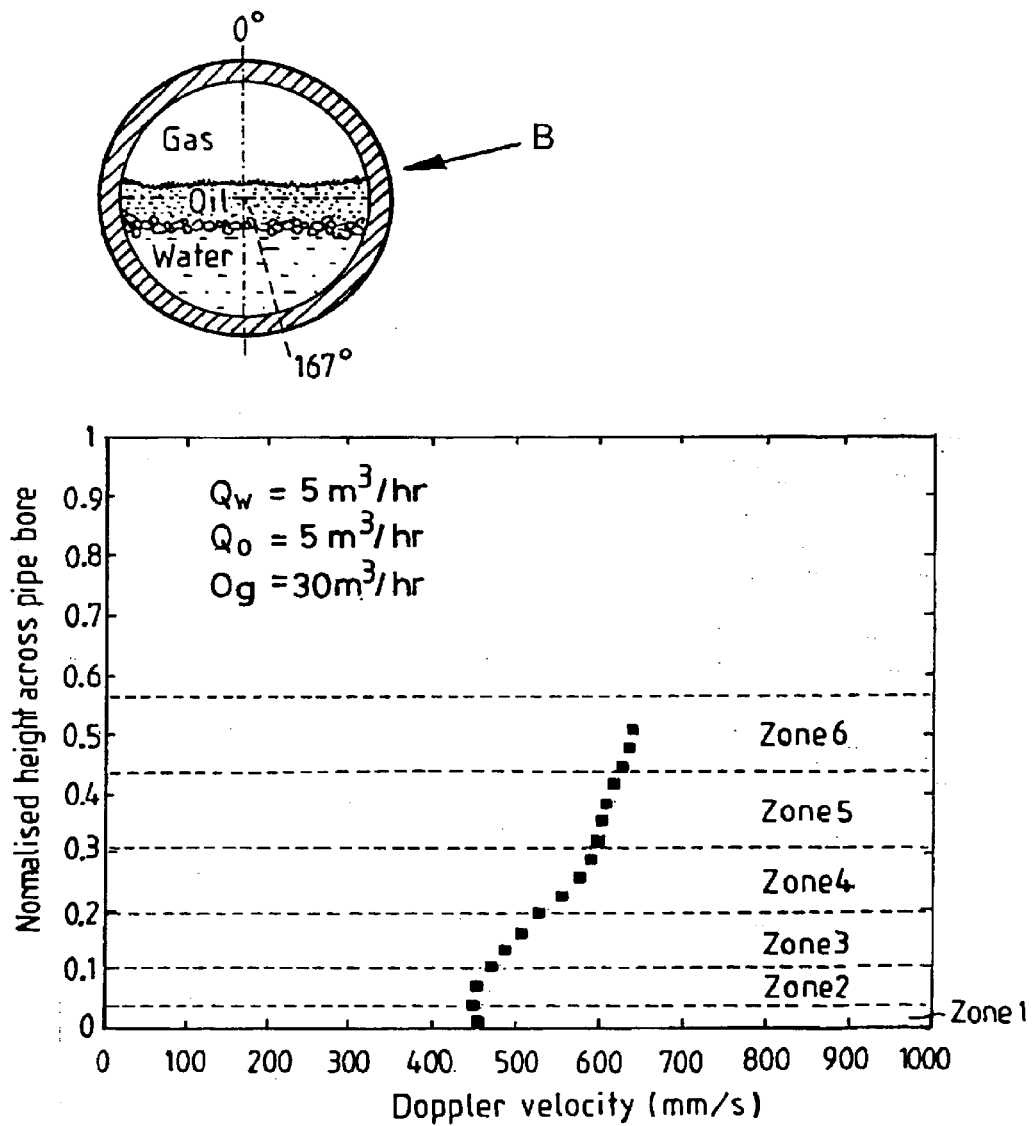
Figure 11:
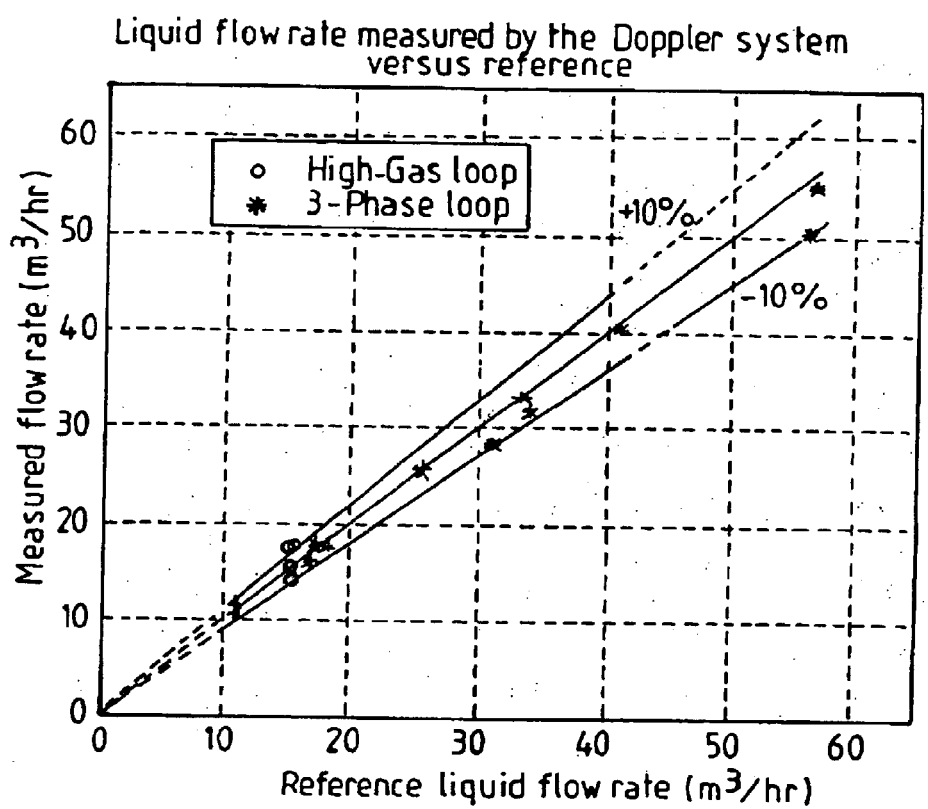

FIG. 9(a) to (f) shows ultrasonic energy signals obtained from shallow depths within the pipe and the corresponding histograms;

FIG. 10 shows a Doppler velocity profile obtained using a flowmeter in accordance with the present invention; and FIG. 11 shows flow rates measured using the flowmeter when compared with reference flow rates.

DESCRIPTION

Figure 1:
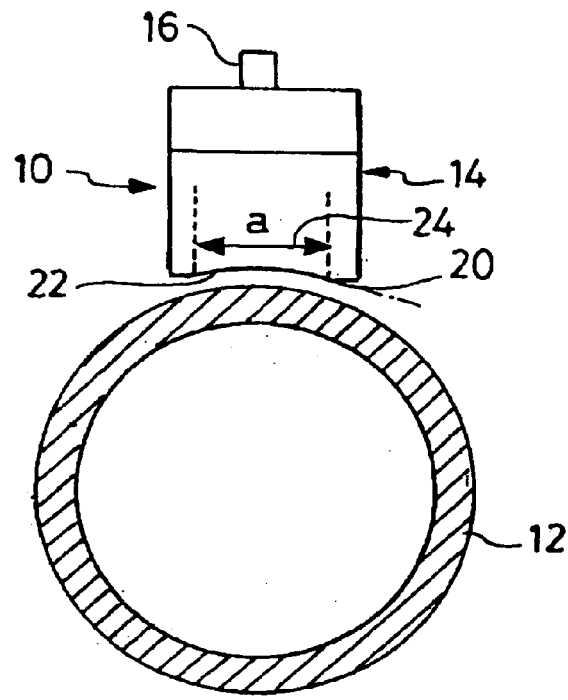
FIG. 1 is a partial sectional view across the pipe having a flowmeter in accordance with the present invention clamped onto the external surface of the pipe.

FIG. 1 shows a schematic view of a flowmeter 10 in accordance with the present invention when clamped to a steel pipe 12 shown in vertical section. The flowmeter 10 comprises a probe 14 which surrounds a transceiver, and a connector 16 which in use is connected to signal processing equipment as will be described later. The lower face 20 of the probe 14 has a groove 22 machined across central portion 24, the groove curvature being selected to be complimentary to the pipe circumference. The central portion 24 thus engages with the pipe wall when the flowmeter is clamped onto the pipe 12 and so ensures that sufficient energy is transmitted from the probe 14 into the wall of the pipe 12.

This flowmeter is applicable to horizontal pipes carrying multi-phase fluid flow and in certain circumstances to vertical pipes with multi-phase flow. It is of particular use as a diagnostic tool in the detection of liquid in gas production lines. The meter consists of at least one narrow band ultrasonic transducer probe, which is mounted on the external surface of a flow conveying pipe, and includes a sound absorbing block which is mounted to the front of the probe to attenuate unwanted energy reflections in the pipe wall. The transducer probe emits signal pulses in the frequency range 100 KHz to 10 MHz, so emitting short bursts of a narrow-band energy into the flow and then receives echoes which are frequency shifted by moving reflectors, such as phase boundaries, according to the Doppler effect, The frequency shift observed for the reflected signed provides a measure of average velocity, and the energy associated with the Doppler signal can also be calculated to assist with discriminating between different phases in the flow.

Doppler frequency shift and energy signals from different viewing angles around the pipe circumference are obtained by moving the probe sequentially to different angular positions, or by mounting multiple Doppler probes at these positions and acquiring data through a multiplexer. Doppler energy and frequency shift information generated at all such positions are combined, through appropriate signal processing, to produce the liquid holdup and liquid flow rate. Gas velocity is derived from the travelling velocity of liquid slugs, which are areas where the entire cross-section of the pipe is filled with liquid, and the velocity of the liquid slugs in turn is obtained from cross-correlation of Doppler energy signals from at least two probes having a known separation along the flow direction.

The meter is particularly suited for monitoring of two-phase flows, to surface monitoring of liquid production from gas wells, and liquid and gas flow metering for oil wells. For three-component producing wells where water forms a stratified layer towards the bottom of a pipe, water holdup can be measured by combining range-gated Doppler profiles from different viewing angles, using a tomography approach. Thus a three-phase flowmeter is possible for such special cases.

A clamp-on non-invasive flowmeter for use on industrial pipelines has many advantages in that it is applicable to either periodic testing or permanent installation, there is no disruption to the industrial/production process during monitoring of the flow, and no production downtime for maintenance even when the meter is permanently installed. The flowmeter is also compact and light as no fluid conduit is used as part of the meter.

The flowmeter 10 will now be described in more detail with reference to FIGS. 2 to 8.

Figure 2:
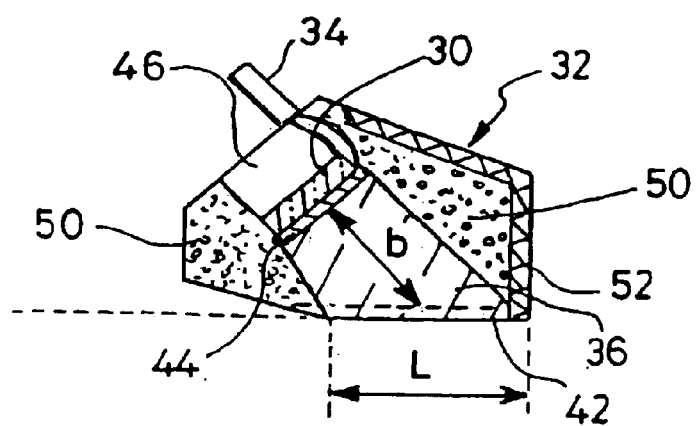
FIG. 2 is a vertical section through the flowmeter.

FIG. 2 shows a vertical section through the flowmeter 10 which comprises a transceiver 30 which is a transducer crystal in the shape of a disc, housing 32 and connector 34.

The transducer crystal 30 is mounted on an angled probe wedge which is made from a hard material, e.g. black Perspex, so as to provide an ultrasound transmission path from the crystal 30 to a contact face 42 which contacts a pipe surface when the meter is in use. An impedance matching layer 44 is used between the crystal 30 and the transmission path rod 36 to improve energy coupling. The diameter of the transmission path rod 36 is slightly larger than that of the crystal disc 30, which ranges between 10 to 25 mm depending upon the frequency at which the disc 30 is designed to operate, with the length of the transmission path inside the probe, b, being around 20–70 mm. The gap between the transmission path rod 36 and the housing 32 is filled with sound absorbing material 50, such as epoxy or rubber loaded with solids, such as metal particles. An inner surface 52 at the front part of the probe housing 32 is made highly scattering, typically saw tooth shape, in order to minimise specular reflections. In order to narrow the bandwidth of the signal transmitted from the transceiver 30 and increase the sensitivity of the transceiver when receiving reflected signals, no damping material is applied to the region 46 behind the crystal 30.

The use of the sound absorbing material 50 is necessary as in metal pipes there is a large mismatch between the acoustic impedance of the pipe wall material and that of the liquid in the pipe. In such cases, only a small fraction of energy is transmitted into the liquid each time the ultrasound signal strikes at the pipe-wall/liquid interface. A much larger portion of the energy is reflected by the two sides of the wall, forming a zig-zag travelling path along the axial direction, and meanwhile this in-wall energy will also spread circumferentially as it travels forward. The multiple reflection described above results in multiple point and multiple delayed energy entry into the liquid, with delay step determined by the wave travelling time between two successive entry points. This wave propagation pattern in the pipe wall complicates the interpretation of the Doppler measurement. For instance, an echo received in a late range gate channel may be caused by a reflector at a greater depth, or by one at a much shallower depth but further away along the axial direction; there is no way to tell. It is therefore not possible, in such a case, to obtain a true Doppler profile measurement across the flow.

The use of a sound absorbing block coupled to the transducer 30 overcomes this problem. The block is made by molding a mixture of epoxy and tungsten powder into the shape shown in FIGS. 1 and 2, with a contact face fit to the curvature of the pipe. At least a 50:50 volume mixing ratio is used to achieve a high acoustic impedance of around 20 Mrayls, which is much better matched to the impedance of the wall material (45 Mrayls for steel) than that of liquid (1.5 Mrayls for water). With such an impedance match, there should be at least 70% of the energy absorbed each time when the wave strikes the block/pipe interface. The mixture of epoxy and tungsten power is also attenuates ultrasound signals to a high degree.

Figure 7:
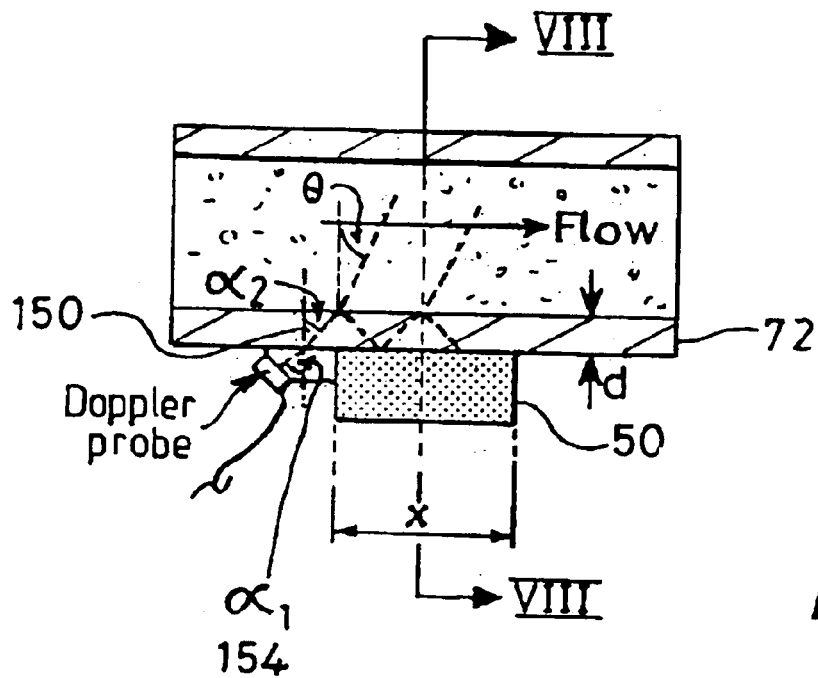
FIG. 7 shows a sectional view through a pipe with a clamped-on flowmeter demonstrating incidence angles of an ultrasonic beam in the pipe and fluid.

The dimension of the block in axial direction, x, and as shown in FIG. 7 should at least cover one beam width in the pipe wall, (which is related to the axial contact length, L, of the probe and the beam diverging angle in the pipe). It is recommended that a x>3L be used. The circumferential contact length of the block, w, should also be at least twice that of the transducer probe. The height of the block is at least 20–70 mm to provide sufficient attenuation to the energy trapped inside. Ultrasonic coupling gel, preferably shear wave coupling gel, is applied between the contact face of the block and the pipe, and the block should be pressed firmly against the pipe wall, by suitable mechanical clamps, to ensure good energy coupling.

Figure 3:
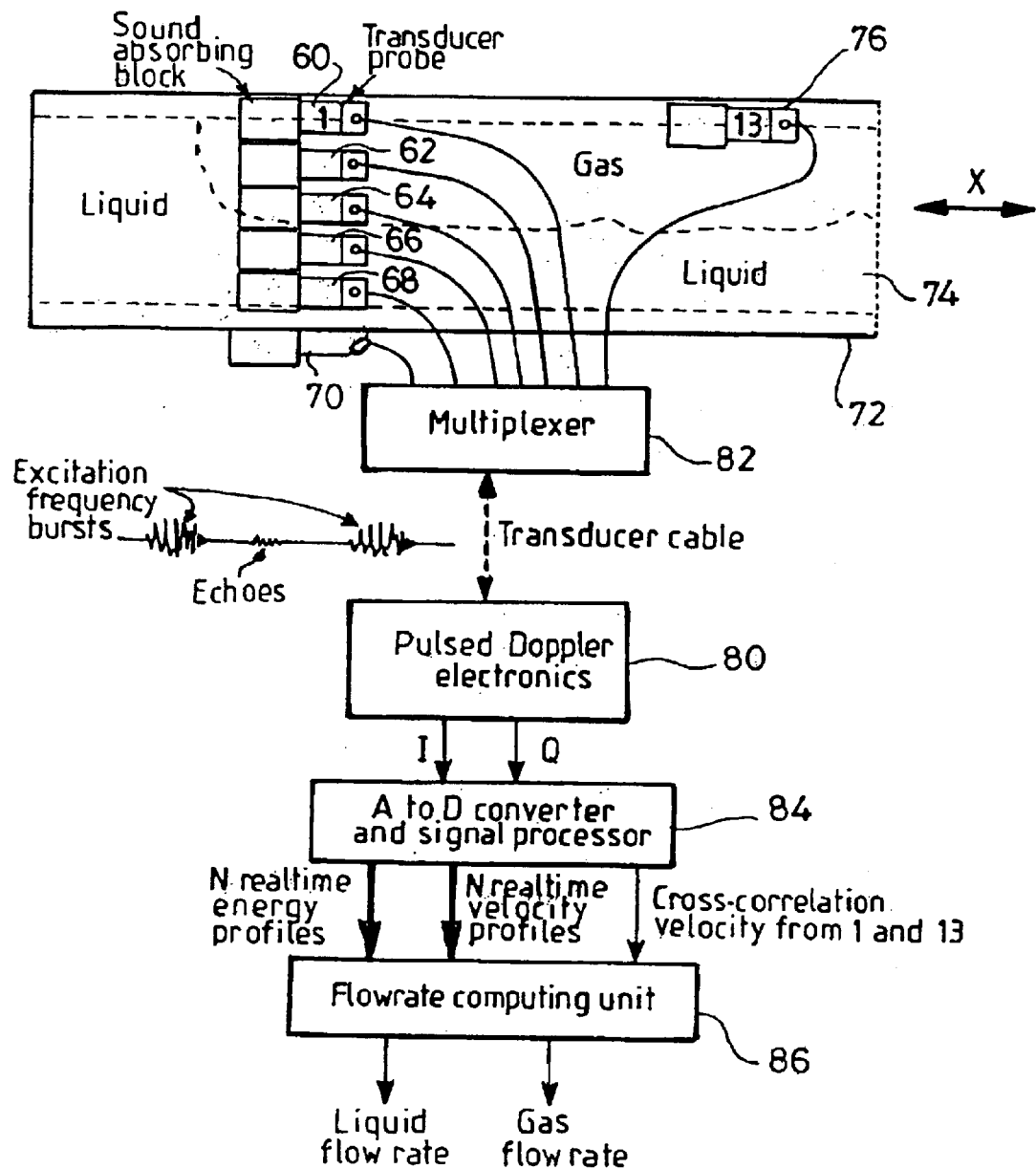
FIG. 3 shows one embodiment of a flowmeter in accordance with the present invention when in use to measure flow rates within a pipe, with signal processing equipment shown in schematic.

An embodiment of the flowmeter using a plurality of transceivers is shown in FIG. 3, where six probes 60, 62, 64, 66, 68, 70 are mounted around a flow carrying pipe 72. The probes do not have to be mounted at the same axial position on the pipe 72 and do not need to transmit into the pipe at the same transmitting angle (although it is convenient to choose the same one), as long as they cover different angular positions around the pipe circumference. Each probe, as described previously in relation to FIG. 2, contains an ultrasonic transducer which produces a pulsed frequency signal, and is shaped as an angled wedge with a contact face fitted to the pipe curvature, allowing efficient energy transmission along the axial direction of the pipe 72. The incidence angle of the pulsed signal to the pipe wall 72 is selected, as explained later with reference to FIG. 7, so that a single shear wave is generated in the pipe wall, which in turn produces a compression wave beam in the flow at an appropriate angle to the pipe axis X. This angle is preferably between 38 and 85 degrees, and even more preferably between 45 to 75°. Under some conditions angles of between 60 to 70 degrees have been found to yield good results. Each transducer probe includes a sound absorbing block, with its acoustic impedance matched to that of the pipe wall 72, with the block being mounted in front of the transducer probe to attenuate the shear wave energy propagating axially inside the pipe wall 72. This reduces the effect of multiple-beam emission into the flow 74 due to the zig-zag path of the in-wall shear wave, and effectively results in a dominant single beam in the flow.

Figure 4:
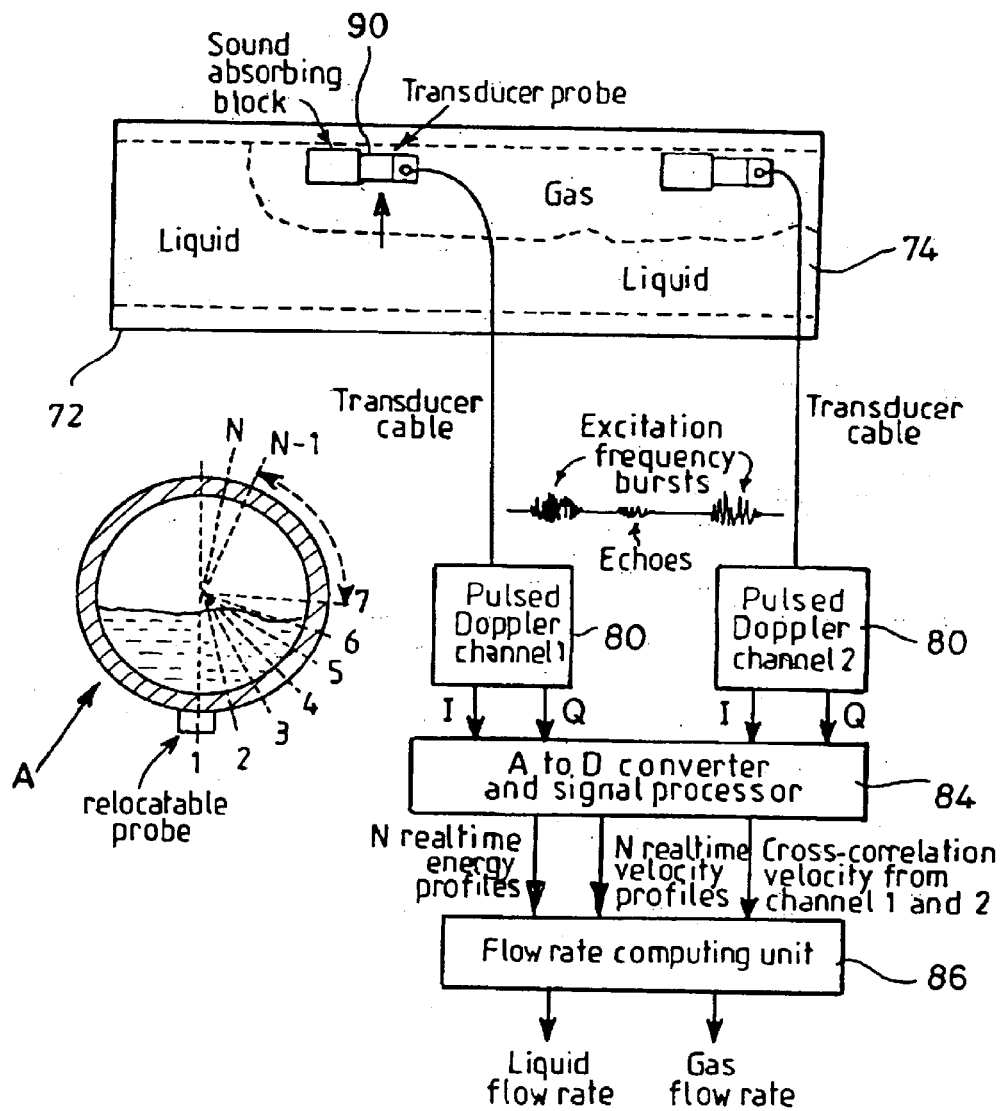
FIG. 4 shows a further embodiment of a flowmeter in accordance with the present invention.

The probes 60, 62, 64, 66, 68, and 70 are connected to a standard circuit of pulsed Doppler electronics 80 via a multiplexer 82, which selects the active measuring probe sequentially to perform a circumferential scan. The scan speed ranges from a few milliseconds per probe to a few minutes per probe depending upon the characteristics of the flow and the accuracy required. An alternative implementation of this scanning process is shown in FIG. 4, where a single probe 90 is moved, by a motorised or manual system, step by step to take different measurements at spaced apart angles around the circumference of the pipe, as shown by Insert A. Equivalent elements to those shown in FIG. 3 are labeled with corresponding reference numerals. The total number of the probes in FIG. 3, or the number of steps in FIG. 4, is determined by the accuracy requirement, the flow characteristics, the cost consideration and the constraint on the measurement time.

When conducting flow measurements, a standard pulsed Doppler measurement is performed by the Doppler electronics circuit at each probe position. A number of electrical voltage pulses, at a given pulse repetition frequency, are applied to the transducer of each probe and the echo signals from the flow received by the transducers are recorded.

The Doppler measurement is repeated for each probe. Each voltage pulse from the transducer in sequence consists of a short burst of a sinusoidal waveform at the so called emitting frequency $f_e$, providing a narrow frequency band excitation. The echo signals received by the transducer are demodulated with the reference emitting frequency $f_e$, producing two signals, one in phase (I) and the other in quadrature (Q) phase relationship with the demodulation reference signal. A low pass filter and a high pass filter built into the electronics remove the unwanted components associated with the emitting frequency and its harmonics from the demodulated signal, and as a result, I and Q, which form a complex Doppler signal D(t) where:

$$D(t)=I(t)+jQ(t) \quad (1)$$

are associated only with the Doppler frequency shift $f_d$ defined by $$f_d = \frac{2f_e V \cos\theta}{c} \quad (2)$$

where c is the velocity of sound in the fluid, V the flow velocity and θ the angle between the ultrasonic beam and V. Note that cos θ in equation is a function of c and the ratio cos θ/c is insensitive to change in the value of c. For liquid holdup measurement using the method set out herein, the value of c is not needed. However, the absolute value of c is needed to calculate the investigation depth in order to produce correct velocity and energy profiles which may be used to deduct the water and oil holdups in stratified distributions.

After digitisation by an A to D converter 84, the I and Q signals are fed to a signal processor, in which the Doppler frequency shift and the flow velocity are estimated, and the echo energy measured. The signal processor provides a range-gated operation on the input signals, producing velocity and energy profiles versus investigation depth in the flow. After a complete measurement operation with a total of N transducer probes (or N scan steps), N matrices containing velocity data and another N matrices containing energy data are produced by the processor. Each matrix has a dimension of n by m, where n, which is index linked to time, is the total number of Doppler velocity or energy measurements on one probe, and m, which is related to depth, is the total number of range gate channels contained in each profile. For each probe, the Doppler velocity and energy signals are derived from the same I and Q signals, and therefore they are simultaneous. A velocity matrix and a energy matrix are generated for any upstream probe, the (N+1)th probe, for cross-correlation measurement.

Figure 6:
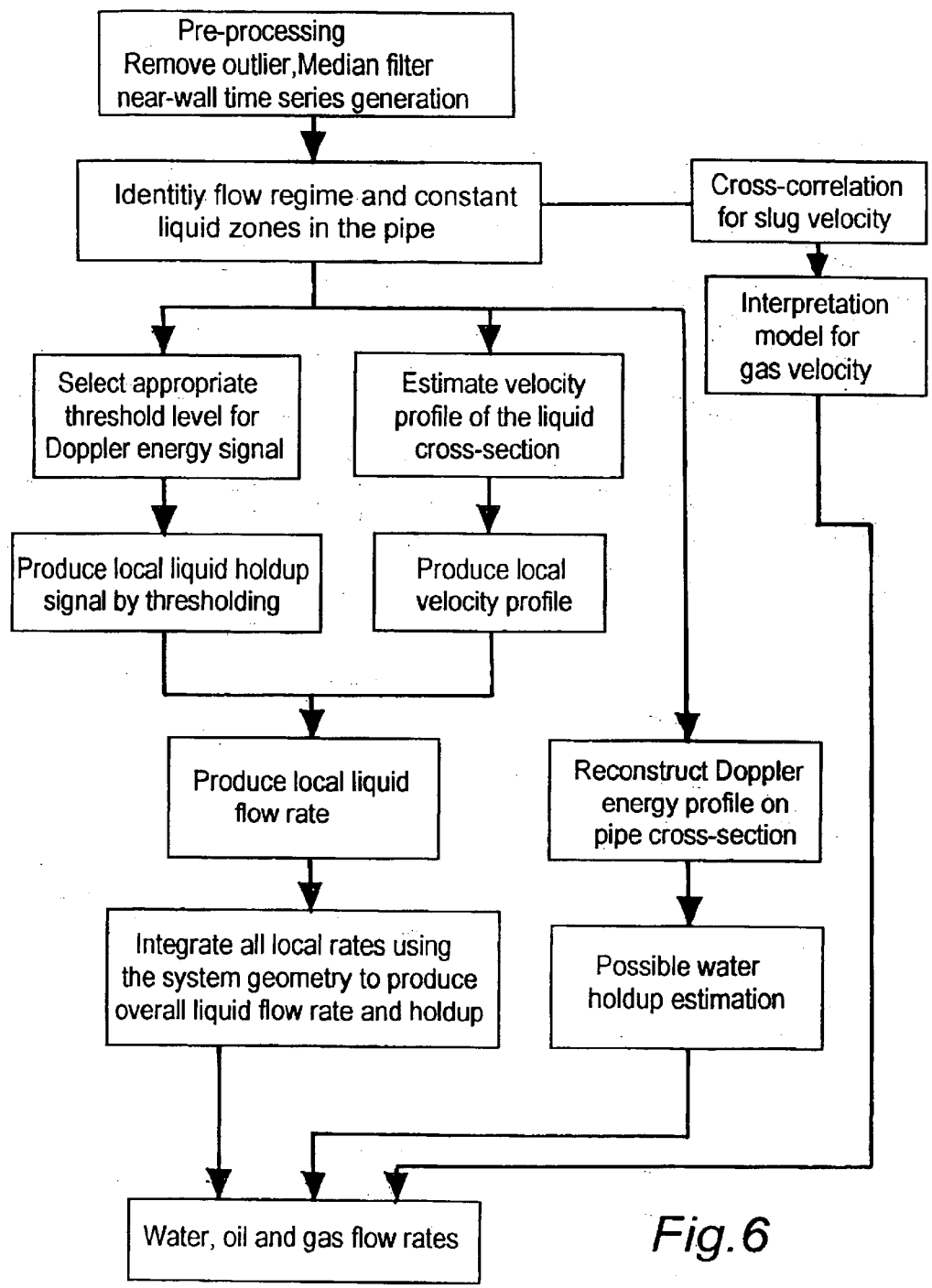
FIG. 6 shows a flow diagram of processing steps undertaken by the signal processing equipment.

The N real-time energy profiles and N real-time velocity profiles, together with additional profiles for cross-correlation measurement are sent to a flow rate computing unit 86 for liquid and gas flow rate calculation. The flow computing unit processes the N real-time Doppler energy profiles and the N real-time velocity profiles to generate the flow rates. FIG. 6 illustrates the basic functions of the unit. There are different ways of implementing the functions shown in the block diagram.

The main processing functions of the unit 86 are as follows:

(i) Produces corresponding near field time series from the full Doppler energy and velocity profiles. Usually this consists of measurements from the first few range gate channels from the wall into the flow. These shallow-depth signals are more reliable for liquid detection since they are not corrupted by later arrivals due to multiple reflection.

(ii) Extracts statistical features, namely mean (S1), variance (S2), skewness (S3) and kurtosis (S4), from the shallow-depth signals, producing signal classifier based on combinations of the statistical features.

(iii) Uses appropriate classifiers to identify signals from different phase zones, such as constant liquid zone (towards bottom of the pipe), the fluctuating interface zone (around the middle height) and slugging zone (upper part of the pipe).

(iv) Finds a threshold value based on the minimum energy level in the liquid zone, and uses this to produce a binary Doppler energy signal representing the instantaneous local liquid holdup.

(v) Combines the holdup with corresponding Doppler velocity signal to produce a local liquid flow rate.

(vi) Integrates all the local flow rates at different angular positions to produce an overall liquid flow rate.

In addition the unit 86 also implements the following functions:

(a) Produces cross-correlation velocity measurement and estimate gas flow rate using appropriate flow models.

(b) Performs tomographic reconstruction using the full range energy and velocity profiles from different view angles to produce cross-sectional velocity and energy distribution profiles of the liquid phase.

(c) Uses the cross-section velocity distribution to correct velocity measurements at positions where the probes face bubbly interfaces and thus have shallow investigation depth, and by doing so improves the accuracy of the flow rate measurement.

(d) Uses the cross-section energy distribution to determine phase interface locations in the pipe, providing water holdup measurement in case of a stratified water distribution and, by combining this with the cross-sectional velocity distribution, separate water and oil flow rate are measured.

The flowmeter embodiments shown in FIGS. 3 and 4 can be used for liquid slug detection by cross-correlating with the signal of axially spaced apart probes to produce a measurement of the slug transit time. Thus in FIG. 3 cross-correlation of the signal from probe 76 with the signal from down-stream probe 62 produces a measurement of slug transit time. Where this cross-correlation is undertaken, the probes are preferably mounted on the upper half of the pipe.

Figure 5:
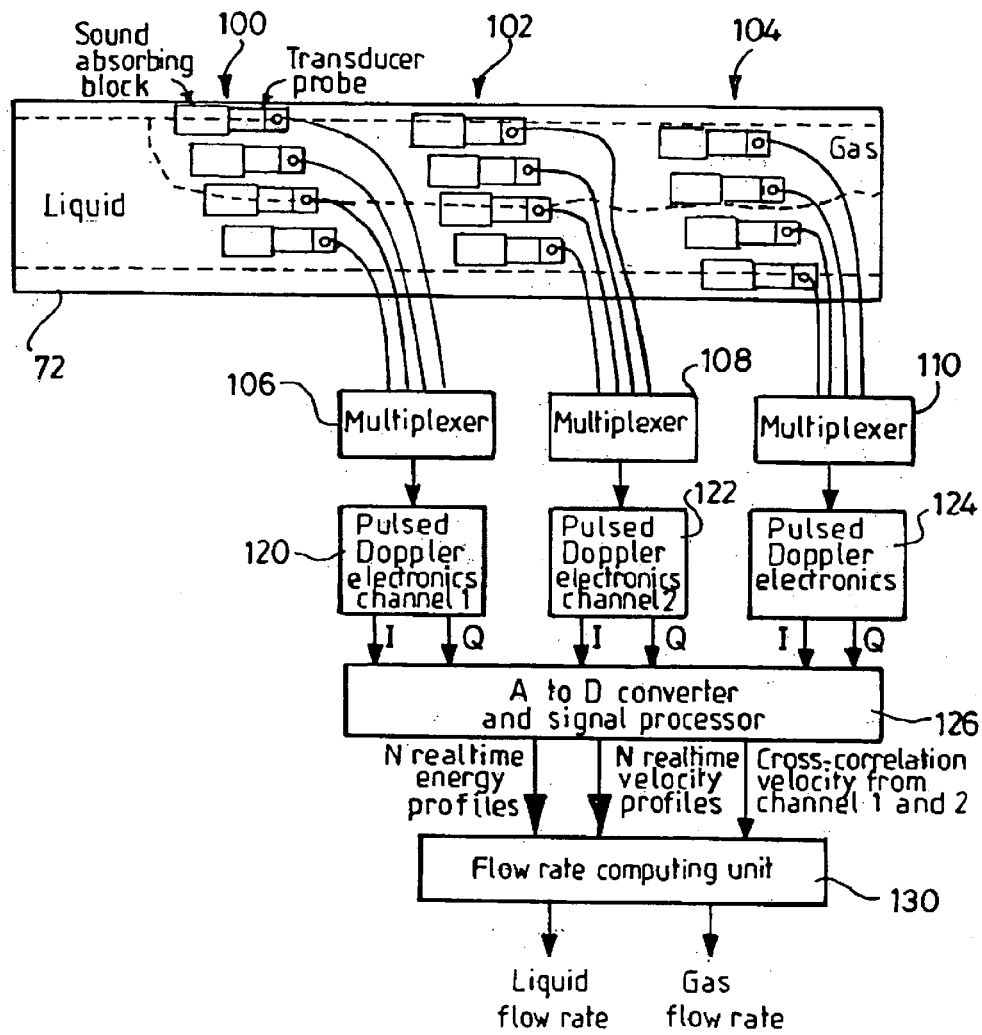
FIG. 5 shows a yet further embodiment of a flowmeter in accordance with the present invention.

An alternative configuration, as shown in FIG. 5, uses several groups 100, 102, 104 of transducer probes with known separation along the axial direction between them. The probes in each group should cover angular positions different from those by other groups, so that maximum number of positions are covered. Each group of probes is connected to a respective multiplexer 106, 108, 110 and to respective electronics 120, 122, 124 for producing a pulsed Doppler signal and receiving data related to the reflected signal. A to D converter and signal processor 126 is used substantially as described previously and gas and liquid flow rates are calculated by flow rate computing unit 130. Cross-correlations between probes in different groups can be made to obtain the slug velocity.

For the configurations described above, there may be various operation modes, parallel, sequential or a combination of the two, in order to meet different measurement speed requirements. For a multi-position measurement system such as shown in FIG. 3, there may be certain advantages to achieve simultaneous measurements on all the positions, such that the information from each position can be combined in a real-time sense to improve accuracy.

For a sequential scan system, the speed of scan is limited fundamentally by the speed of sound in the flow liquid and by the size of the pipe. This is because a measurement on a new position can only begin after the echoes from the previous measurement position decay to a insignificant level. Energy cross-talk between different angular positions is a serious problem for parallel measurement mode, in which all probes are pulsed simultaneously and echoes recorded simultaneously. If the simultaneously pulsed probes are well separated spatially, then the cross-talk tends to occur in the deep range-gate channels, rather than in the shallow ones corresponding to the region near the pipe wall.

For the purpose of liquid detection, the echoes from the shallow-depth region (to a depth of around a 10–20 mm) will provide sufficient information. Therefore a parallel operation mode, which only records cross-talk free echoes from a few range gate channels corresponding to the shallow-depth region, can be used. However, information from greater depth, which is needed in a tomographic reconstruction of the flow cross-section is only obtained in sequential scan mode. Usually for a stable multi-phase phase flow, a slow sequential scan mode is adequate. At each position, continuous measurement up to a few minutes can be performed before moving or switching to the next position. The Doppler pulse repetition frequency (which is also the sampling frequency for flow measurement) is usually a few kilohertz. Therefore the measurement performed on each position produces real-time records of Doppler velocity and energy. In such a mode, the signals acquired at different positions are also at different time intervals. Assuming statistically stationary flow, i.e. the statistical properties of the flow are the same for all the intervals, then the local flow rates derived from measurement on individual positions can be integrated according to the measurement geometry to produce an overall flow rate.

Thus the flowmeter does not rely upon absolute value measurement and therefore requires no calibration. Combining an angled shear wave transducer probe with a sound absorbing block reduces multiple reflections in the pipe wall by reducing impedance mismatch between the probe and the steel pipe and creates a single dominant energy beam in the flow, making range-gated Doppler measurement more interpretable. The flowmeter uses Doppler energy measurement to detect the presence of the liquid phase and uses such measurement at multiple angular positions around the pipe to obtain the overall liquid holdup. This is made possible as:

(i) only the moving reflectors conveyed by the liquid phase produce the frequency-shifted Doppler energy whereas gas regions or static interfaces such as scale layer or thin liquid film do not; and (ii) in horizontal flows, the distribution of the liquid in the pipe is asymmetrical with the liquid rich region lying towards the lower part of the pipe, mostly in stratified distribution, whereas the upper part is covered by air, liquid film or intermittently by liquid slugs, depending upon the flow regime.

When setting up the flowmeter, the incidence angle of the ultrasonic beam to the pipe needs to be selected to ensure that the pulsed Doppler signal is principally a shear wave, and ideally a pure shear wave with no element of compression present.

Figure 8:
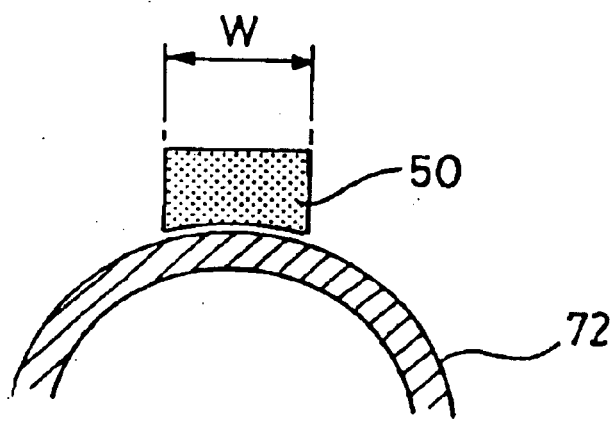
FIG. 8 is an inverted cross-section along line VIII—VIII of FIG. 7.
Figure 9A:
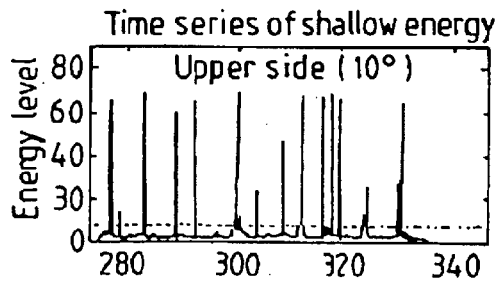
Figure 9B:
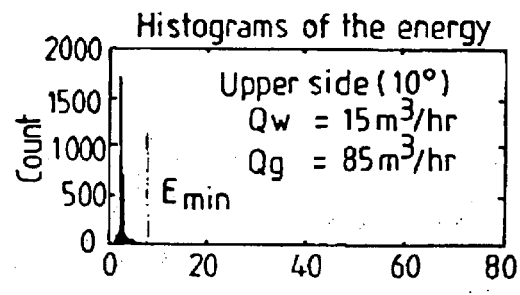
Figure 9C:
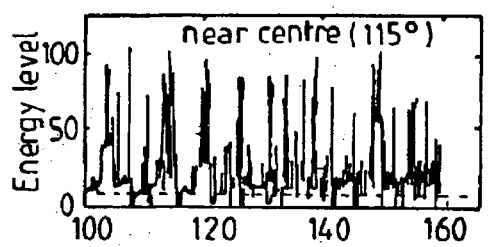
Figure 9D:
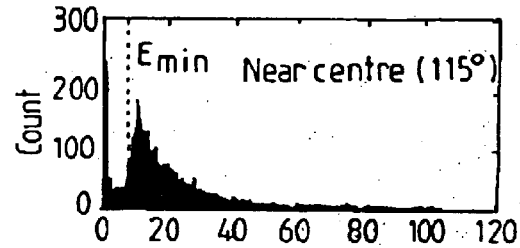
Figure 9E:
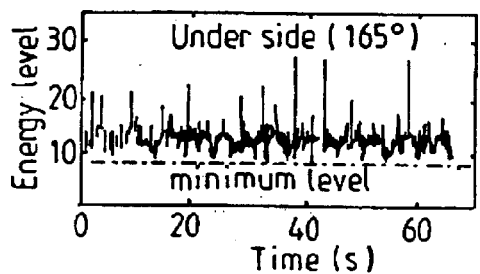
Figure 9F:
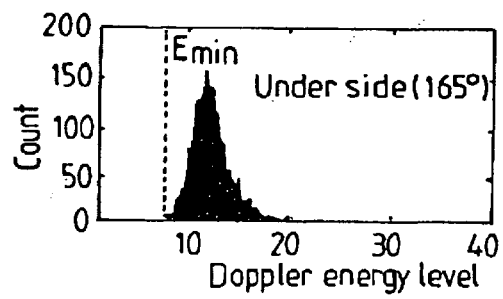

A sectional view through a pipe with a clamped-on flowmeter is shown in FIG. 7. The incidence angle 150 of the ultrasonic beam to the liquid, $\alpha_2$ is shown. FIG. 8 shows a cross-section along line VIII—VIII in FIG. 7. To achieve a shear wave, the incidence angle 154 to the pipe, $\alpha_1$, is selected according to Snell's law:

$$\frac{\sin \alpha_1}{c_1} = \frac{\sin \alpha_2}{c_2} \quad (3)$$

where $c_1$ is the sound velocity in the transmission path material, $c_2$ that in the pipe wall material and $\alpha_2$ is the refraction angle 150 in the pipe wall. For steel pipes and perspex transmission rod, $\alpha_1$ is in the range of 35 to 55 degrees (which is above the shear critical angle for Perspex/steel) to ensure only a shear (transverse) wave is generated in the pipe wall. Thus complications by the presence of longitudinal and surface wave modes in the pipe wall can be avoided. The shear wave generated in such a way is mode converted into a compression wave in the liquid phase, forming a Doppler angle θ, which is in the range of 62 to 73 degrees in water.

In order to ensure sufficient energy transmission into the pipe wall, the contact face is machined to fit the curvature of the pipe wall, as described before, so as to achieve sufficient contact area. The contact length in the axial direction, L, and that in circumferential direction, a, as shown in FIGS. 1 and 2 are normally chosen to be the same as the transducer diameter, i.e. between 10 and 20 mm. An ultrasound coupling gel, such as a shear wave coupling gel, is also be applied between the probe contact face 24 and the pipe to improve the transmission. Note that in FIG. 2, the rear of face 20 is upwardly tapered so that the axial contact length L is shorter than the overall length of face 20. This is to eliminate unwanted energy incidence at small angles, which may be generated from the rear edge of the crystal, and which may cause compression wave or shear wave modes with undesired refraction angles to be generated in the pipe wall.

Some results obtained using the flowmeter in accordance with the present invention will now be described with reference to FIGS. 9, 10 and 11.

In FIG. 9, graphs (a), (c) and (e) show energy level against time for shallow-depth ultrasound energy signals obtained with a probe at the upper side of the pipe for graph (a), the probe a little below the pipe center for graph (c) and at the underside of the pipe for graph (e). Histograms of the energy are shown in graphs (b), (d), (f) with the count plotted against Doppler energy levels. Histogram (b) corresponds to graph (a), with histogram (d) corresponding with graph (c), and histogram (f) corresponding to graph (e). Using the shallow part of the Doppler energy profile in this way improves the reliability of liquid detection within the pipe and can be achieved by choosing the first M range-gate channels in the pipe wall, which cover typically the near wall region about 10 to 20 mm into the flow, and by using the medium energy value of the M channels to construct the time series of a shallow-depth energy signal.

A cross-section energy profile provides information on interface distribution in the pipe, which provide a water holdup measurement if water and oil in the liquid phase is largely separated by a more or less stratified oil/water interface.

A cross-sectional velocity profile provides information on water velocity and oil velocity separately if the two phases are separated. Water and oil flow rates can be derived separately by combining the energy and velocity cross-sectional profiles.

FIG. 10 shows a Doppler velocity profile across the pipe, the reading being taken at 167° as shown by insert B. As will be seen, the velocity varies across the pipe diameter depending on the phase.

FIG. 11 shows the liquid flow rate measured by a flowmeter in accordance with the present invention when compared to a reference liquid flow rate. Within reasonable error, the flowmeter provides an accurate gauge of liquid flow rate.

What is claimed is:

1. Apparatus for measuring flow rates of at least a first phase and a second phase flowing in a metal pipe, the apparatus comprising:
   one or more transceivers adapted and configured to generate a pulsed narrow band signal which propagates through the wall of the metal pipe and into fluid within the metal pipe, the pulsed signal being in the range 100 KHz to 10 MHz;

one or more sound absorbing blocks adapted to be in direct contact with the external surface of the metal pipe so as to reduce or prevent reflections occurring within the wall of the metal pipe in response to the pulsed signal; and a signal processor adapted and configured to analyze the frequency shift and the signal strength in the Doppler shifted portion of the reflected signals received by the one or more transceivers, wherein the signal processor is configured and programmed to calculate at least the flow rate of the first phase and the flow rate of the second phase flowing in the metal pipe based on both the analyzed frequency shift and signal strength of the Doppler shifted portion of the reflected signals.

2. Apparatus according to claim 1, in which the signal that the one or more transceivers are operable to generate is a narrow band ultrasonic signal.

3. Apparatus according to claim 1, wherein the signal processor comprises range-gate channels.

4. Apparatus according to claim 1, wherein at least one of the one or more sound absorbing blocks is impedance matched to the wall of the metal pipe, and at least one of the one or more transceivers and the at least one of the one or more sound absorbing blocks are contained in a common housing.

5. Apparatus according to claim 1, wherein the one or more transceivers comprises a plurality of transceivers.

6. Apparatus according to claim 5, wherein the one or more sound absorbing blocks is a plurality of sound absorbing blocks, each transceiver being held in a common housing with a respective sound absorbing block.

7. Apparatus according to claim 6, wherein the common housing includes a frequency transparent material to allow signals from the transceiver to be emitted from the housing without distortion.

8. Apparatus according to claim 7, wherein the housing comprises a contact face for engaging with a pipe, the contact face having a groove of complimentary curvature to a pipe wall so as to provide sufficient contact area between the housing and the pipe.

9. Apparatus according to claim 8, wherein the sound absorbing block is made from plastics material with metal particles embedded therein.

10. Apparatus according to claim 9, wherein the sound absorbing block comprises an irregular surface to scatter unwanted reflected signals.

11. Apparatus according to claim 10, wherein the irregular surface presents a repeating saw tooth edge in profile.

12. Apparatus according to claim 1, wherein the one or more sound absorbing blocks each has its impedance substantially matched to that of a pipe wall on which the apparatus is to be used.

13. Apparatus according to claim 1, wherein the pulsed signal is emitted at an appropriate angle to the pipe so as to generate a shear wave in the pipe wall.

14. A method for measuring flow rates of a first phase and a second phase flowing in a metal pipe, comprising attaching one or more transceivers and one or more sound absorbing blocks to the metal pipe containing the first phase and the second phase, generating a pulsed narrow band ultrasonic signal in the range 100 KHz to 10 MHz, transmitting the pulsed signal through the wall of the metal pipe and into fluid within the metal pipe, wherein the one or more sound absorbing blocks are adapted to be in direct contact with the external surface of the metal pipe so as to reduce or prevent reflections occurring within the wall of the metal pipe in response to the pulsed signal, receiving a reflected signal from the first and second phases and analyzing the frequency shift and the signal strength in the Doppler shifted portion of the reflected signal to determine at least the flow rate of the first phase and the flow rate of the second phase flowing in the metal pipe based on both the analyzed frequency shift and signal strength of the Doppler shifted portion of the reflected signals.

15. A method according to claim 14, further comprising angling the one or more transceivers relative to the pipe to which it is attached, so as to achieve propagation of the pulse signal as a shear wave in the pipe wall.

16. A method according to claim 15, wherein the pulsed signal propagates as a shear wave at an angle between 38–85° in the pipe wall.

17. A method according to claim 16, in which said pulsed signal propagates as a shear wave at an angle between 45°–75° in the pipe wall.

18. A method according to claim 17, in which said pulsed signal propagates as a shear wave at an angle between 60°–75° in the pipe wall.

19. A method according to claim 14, wherein reflected signals are analyzed according to depth of origin using range-gate channels.

20. A method according to claim 14, further comprising measuring the reflected signal at a plurality of positions, the measurements being spaced apart in time.

* * * * *